J. SPEAR.

Base-Burning Stove.

No. 4,985. Reissued July 16, 1872.

Witnesses { Jno. P. Lay / A. Leickmeyer

James Spear

AM. PHOTO-LITHOGRAPHIC CO. N.Y. (OSBORNE'S PROCESS.)

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 89,180, dated April 20, 1869; reissue No. 4,985, dated July 16, 1872.

DIVISION A.

SPECIFICATION.

*To whom it may concern:*

Be it known that I, JAMES SPEAR, of No. 1116 Market street, Philadelphia, Pennsylvania, have invented certain new and useful Improvements in "Stoves," commonly known as hot-air base-burning stoves, used for heating a parlor and the room above at the same time.

The nature of my invention consists in the construction of the crown-top of a stove so that the opening for the admission of coal to the reservoir is covered by a swinging urn, and the exit for the heated air to the room above is through a pipe leading from the rear of the casting behind the urn. The object of this construction of the crown-top is to permit a hot-air stove heating the room above to be finished with an urn on the top, as is usual for parlor-stoves.

To enable others skilled in the art to make and use my invention, I will proceed to describe its construction and operation.

Figure 1:
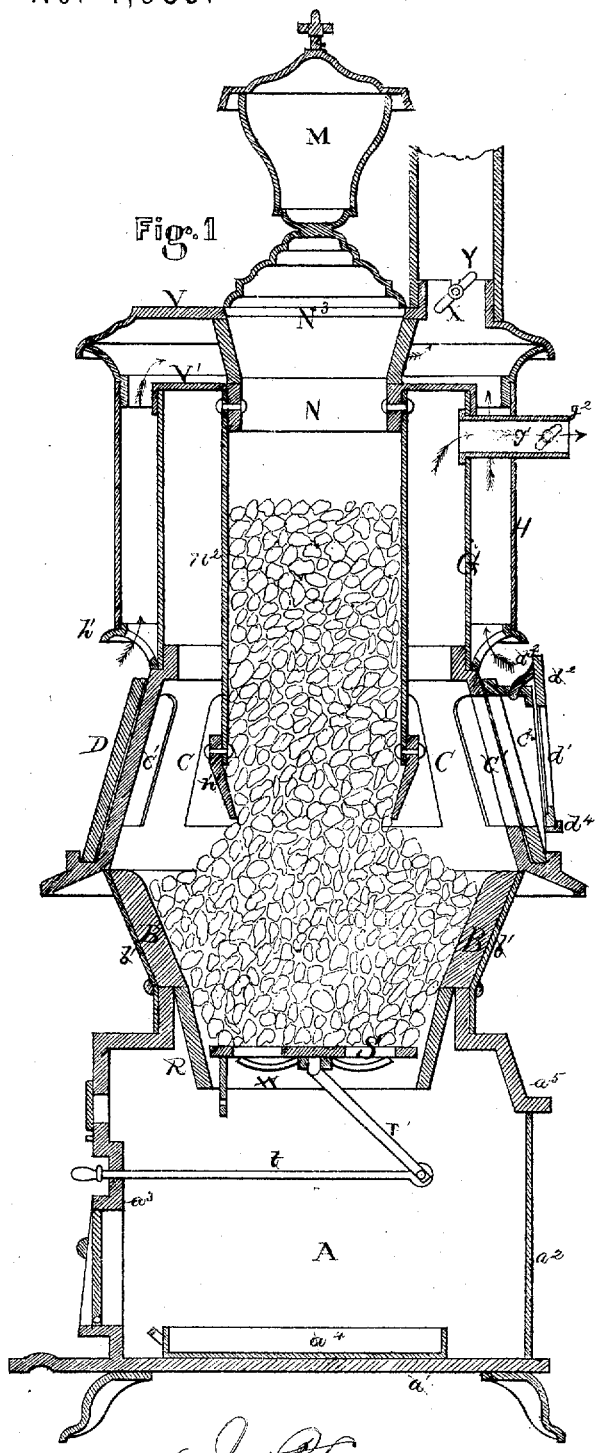
Figure 2:
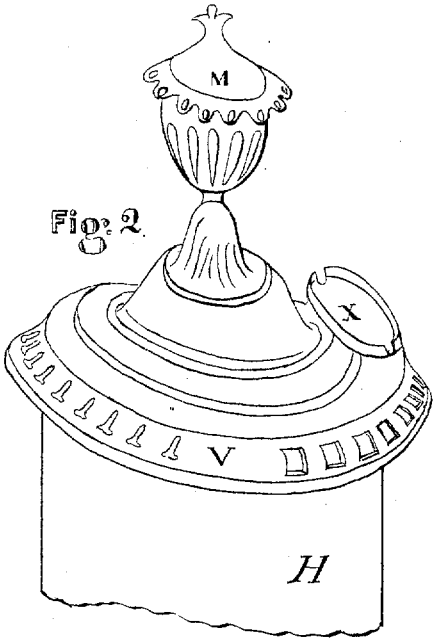

Figure 1 is a section through the stove. Fig. 2 is a perspective view of the crown-top and urn.

A complete description of this stove, with the exception of the improvements herein detailed, will be found in my patent of July, 1868.

In this stove the smoke and gases from the fuel pass within the sheet-iron cylinder G, out through $g^1$ and damper $g^2$ to the chimney. This cylinder is closed at the top by the cast-iron ring V′, riveted to the reservoir $n^2$. Outside the cylinder G is another sheet-iron case, H, resting upon the cast-iron ring $h'$. Through holes in this ring $h'$ passes the cold air, which becomes heated against the cylinder G, and passes upward into the crown-top V, and out through the pipe X into the room above, which it enters through a register in the floor. The crown-top V is cast with a central circular opening, $N^3$, covered by a swinging urn, M. By removing the urn to one side the coal can be dumped into the reservoir N, as is usual in reservoir-stoves. At the rear of the crown-top, next to the chimney, I cast a branch outlet, X, for the exit of heated air. A pipe attached to this outlet conveys the heated air to any part of the building which may require it.

By this arrangement and construction of the crown-top the stove can be finished with a central urn in an ornamental manner, different from hot-air stoves with the pipe up the center.

The lower part of the stove consists of the cast-iron conical section C, having an exterior revolving casing D, with illuminating-windows. Below this is the fire-pot B and the revolving and dumping grate S. These are described in my patent of July, 1868.

I do not claim the sheet-iron casing H for confining heated air.

What I claim as my invention, and desire to secure by Letters Patent, is—

1. The construction of the crown-top V with an outlet, X, and central opening $N^3$, in combination with the urn M, arranged in combination substantially as shown and described.

2. The construction of the hollow crown-top V with an outlet, X, in the rear for the exit of heated air to the room above, arranged in combination with the interior and exterior casings G and H, so that the heated air rising from between the casings circulates within the crown-top and passes through the said outlet, as and for the purpose described.

JAMES SPEAR.

Witnesses:
EDWD. BROWN,
JOHN F. GRANT.